United States Patent
Xiu et al.

(10) Patent No.: US 12,166,965 B2
(45) Date of Patent: Dec. 10, 2024

(54) METHODS AND APPARATUS FOR SIGNALING SYMMETRICAL MOTION VECTOR DIFFERENCE MODE

(71) Applicant: BEIJING DAJIA INTERNET INFORMATION TECHNOLOGY CO., LTD., Beijing (CN)

(72) Inventors: Xiaoyu Xiu, San Diego, CA (US); Yi-Wen Chen, San Diego, CA (US); Xianglin Wang, San Diego, CA (US); Shuiming Ye, San Diego, CA (US); Tsung-Chuan Ma, San Diego, CA (US); Hong-Jheng Jhu, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 257 days.

(21) Appl. No.: 17/538,180

(22) Filed: Nov. 30, 2021

(65) Prior Publication Data

US 2022/0094913 A1    Mar. 24, 2022

Related U.S. Application Data

(63) Continuation of application No. PCT/US2020/035571, filed on Jun. 1, 2020.
(Continued)

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/172* (2014.11); *H04N 19/573* (2014.11)

(58) Field of Classification Search
None
See application file for complete search history.

(56) References Cited

U.S. PATENT DOCUMENTS 11,025,936 B2 *   6/2021   Li .................. H04N 19/577
2019/0098298 A1   3/2019   Jeon et al.

FOREIGN PATENT DOCUMENTS

| KR | 20190033029 A | 3/2019 | |
| WO | 2020132272 A1 | 6/2020 | |
| WO | WO-2020131659 A2 * | 6/2020 | ........... H04N 19/105 |

OTHER PUBLICATIONS

Bross et al., "Versatile Video Coding (Draft 5)", JVET Meeting 14, Mar. 19, 2019-Mar. 27, 2019, Geneva, (The Joint Video Exploration Team of ISO/IEC JTC1/SC29/WG11 and ITU-T SG.16), No. JVET-N001, May 29, 2019, pp. 1-383. (Year: 2019).*

(Continued)

*Primary Examiner* — James M Anderson, II
(74) *Attorney, Agent, or Firm* — Arch & Lake LLP

(57) ABSTRACT

A computer implemented method for symmetrical motion vector difference (SMVD) mode, apparatus, and a non-transitory computer-readable storage medium are provided. The decoder obtains a first and second reference picture associated with a current video block, a first reference picture list of the current video block, and a second reference picture list of the current video block. The decoder receives motion parameters and calculates a first motion vector associated with the first reference picture by adding the MVD to corresponding motion vector predictor associated with the first reference picture, and calculates a second motion vector associated with second reference picture by subtracting the MVD from corresponding motion vector predictor associated with the second reference picture. The decoder obtains a prediction signal of the current video (Continued)

block by combining the prediction blocks generated based on the first motion vector and the second motion vector.

10 Claims, 5 Drawing Sheets

Related U.S. Application Data

(60) Provisional application No. 62/854,961, filed on May 30, 2019.

(51) Int. Cl.
*H04N 19/172* (2014.01)
*H04N 19/573* (2014.01)

(56) References Cited

OTHER PUBLICATIONS

The H.264 Advanced Video Compression Standard, (42p).
Liu, Hongbin et al., AGH11: Mmvd without Fractional Distances for SCC, Joint Video Experts Team (JVET) of ITU-T SG 16 WP 3 and ISO/IEC JTC 1/SC 29/WG 11, Document: JVET-M0255, 13th Meeeting: Marrakech, MA Jan. 9-18, 2019, (6p).
Chen, Jianle et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11, Document: JVET-M1002-v2, 13th Meeting: Marrakech, MA, Jan. 9-18, 2019, (62p).
Bross, Benjamin et al., "Versatile Video Coding (Draft 5)", Joint Video Experts Team (JVET) of ITU-T SG 16 WP 3 and ISO/IEC JTC 1/SC 29/WG 11, Document: JVET-N1001-v7, 14th Meeting: Geneva, CH, Mar. 19-27, 2019, (381p).
Supplementary Partial European Search Report of EP Application No. 20813196.1 dated Jan. 24, 2023, (21p).
International Search Report of International Application No. PCT/US2020/035571 dated Aug. 31, 2020, (3p).
Bross, Benjamin, et al., Versatile Video coding (Draft 5), Joint Video Experts Team (JVET) of ITU-T SG 16 WP 3 and ISO/IEC JTC 1/SC 29/WG 11, 14th Meeting: Geneva CH, [Document: JVET-N1001-v7], May 29, 2019, (384p).
Jang, Hyeongmun, et al., "AhG2: Mismatch between text specification and reference software on SMVD", Joint Video Experts Team (JVET) of ITU-T SG 16 WP 3 and ISO/IEC JTC 1/SC 29/WG 11, 14th Meeting: Geneva CH, [Document: JVET-N0470_v3], Mar. 23, 2019, (3p).
Lee, Hahyun, et al., "Non-CE4: Simplification of decoding process for SMVD reference indices", Joint Video Experts Team (JVET) of ITU-T SG 16 WP 3 and ISO/IEC JTC 1/SC 29/WG 11, 14th Meeting: Geneva CH, [Document: JVET-N0471_v2], Mar. 22, 2019, (6p).

\* cited by examiner

METHODS AND APPARATUS FOR SIGNALING SYMMETRICAL MOTION VECTOR DIFFERENCE MODE

CROSS-REFERENCE TO RELATED APPLICATIONS

This application is a continuation application of PCT application No. PCT/US2020/035571 filed on Jun. 1, 2020, which is based upon and claims priority to Provisional Application No. 62/854,961 filed on May 30, 2019, the entire disclosures of which are incorporated herein by reference in their entireties for all purposes.

TECHNICAL FIELD

This disclosure is related to video coding and compression. More specifically, this disclosure relates to methods and apparatus on the signaling method of symmetrical motion vector difference (SMVD) mode.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate while avoiding or minimizing degradations to video quality.

SUMMARY

Examples of the present disclosure provide methods and apparatus for video decoding using symmetrical motion vector difference (SMVD).

According to a first aspect of the present disclosure, a computer-implemented method for symmetrical motion vector difference (SMVD) mode is provided. The method may include obtaining, at a decoder, a first reference picture and a second reference picture associated with a current video block. One of the first reference picture and the second reference picture may be before a current picture and the other may be after the current picture in display order. The method may also include obtaining, at the decoder, a first reference picture list of the current video block which includes the first reference picture. The method may include obtaining, at the decoder, a second reference picture list of the current video block which includes the second reference picture. The method may additionally include receiving, by the decoder, motion parameters. The motion parameters are signaled by an encoder into a bitstream based on the SMVD mode. The motion parameters include syntax elements smvd_distance_idx and smvd_direction_idx respectively specifying magnitude and direction of motion vector difference (MVD) for the SMVD mode. The method may include calculating, at the decoder, a first motion vector associated with the first reference picture by adding the MVD to corresponding motion vector predictor associated with the first reference picture. The method may also include calculating, at the decoder, a second motion vector associated with second reference picture by subtracting the MVD from corresponding motion vector predictor associated with the second reference picture. The method may include obtaining, at the decoder, a prediction signal of the current video block by combining the prediction blocks generated based on the first motion vector and the second motion vector According to a second aspect of the present disclosure, a computer implemented method for merge mode with motion vector differences (MMVD). The method may include receiving, by a decoder, syntax elements. The syntax elements are signaled into a bitstream based on the MMVD to indicate motion vector difference (MVD) values that are added to motion of a selected merge candidate and the syntax elements includes a merge candidate flag used to select the merge candidate. The MVD values include one or more arbitrary numbers within an allowed dynamic range of the MVD values. The method may also include obtaining a prediction signal of a current video block based on the motion of the selected merge candidate.

According to a third aspect of the present disclosure, a computing device for decoding a video signal is provided. The computing device may include one or more processors, a non-transitory computer-readable memory storing instructions executable by the one or more processors. The one or more processors may be configured to obtain a first reference picture and a second reference picture associated with a current video block. One of the first reference picture and the second reference picture may be before a current picture and the other may be after the current picture in display order. The one or more processors may also be configured to obtain a first reference picture list of the current video block which includes the first reference picture. The one or more processors may be configured to obtain a second reference picture list of the current video block which includes the second reference picture. The one or more processors may be configured to receive motion parameters. The motion parameters are signaled by an encoder into a bitstream based on a symmetrical motion vector difference (SMVD) mode. The motion parameters include syntax elements smvd_distance_idx and smvd_direction_idx and they respectively specify magnitude and direction of motion vector difference (MVD) for the SMVD mode. The one or more processors may be configured to calculate a first motion vector associated with the first reference picture by adding the MVD to corresponding motion vector predictor associated with the first reference picture. The one or more processors may be configured to calculate a second motion vector associated with second reference picture by subtracting the MVD from corresponding motion vector predictor associated with the second reference picture. The one or more processors may be configured to obtain a prediction signal of the current video block by combining the prediction blocks generated based on the first motion vector and the second motion vector.

According to a fourth aspect of the present disclosure, a non-transitory computer-readable storage medium having stored therein instructions is provided. When the instructions are executed by one or more processors of the apparatus, the instructions may cause the apparatus to perform receiving syntax elements. The syntax elements are signaled into a bitstream based on a merge mode with motion vector differences (MMVD) to indicate motion vector difference (MVD) values that are added to motion of a selected merge candidate and the syntax elements includes a merge candidate flag used to select the merge candidate. The MVD values include one or more arbitrary numbers within an allowed dynamic range of the MVD values. The instructions may also cause the apparatus to perform obtaining a prediction signal of a current video block based on the motion of the selected merge candidate.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
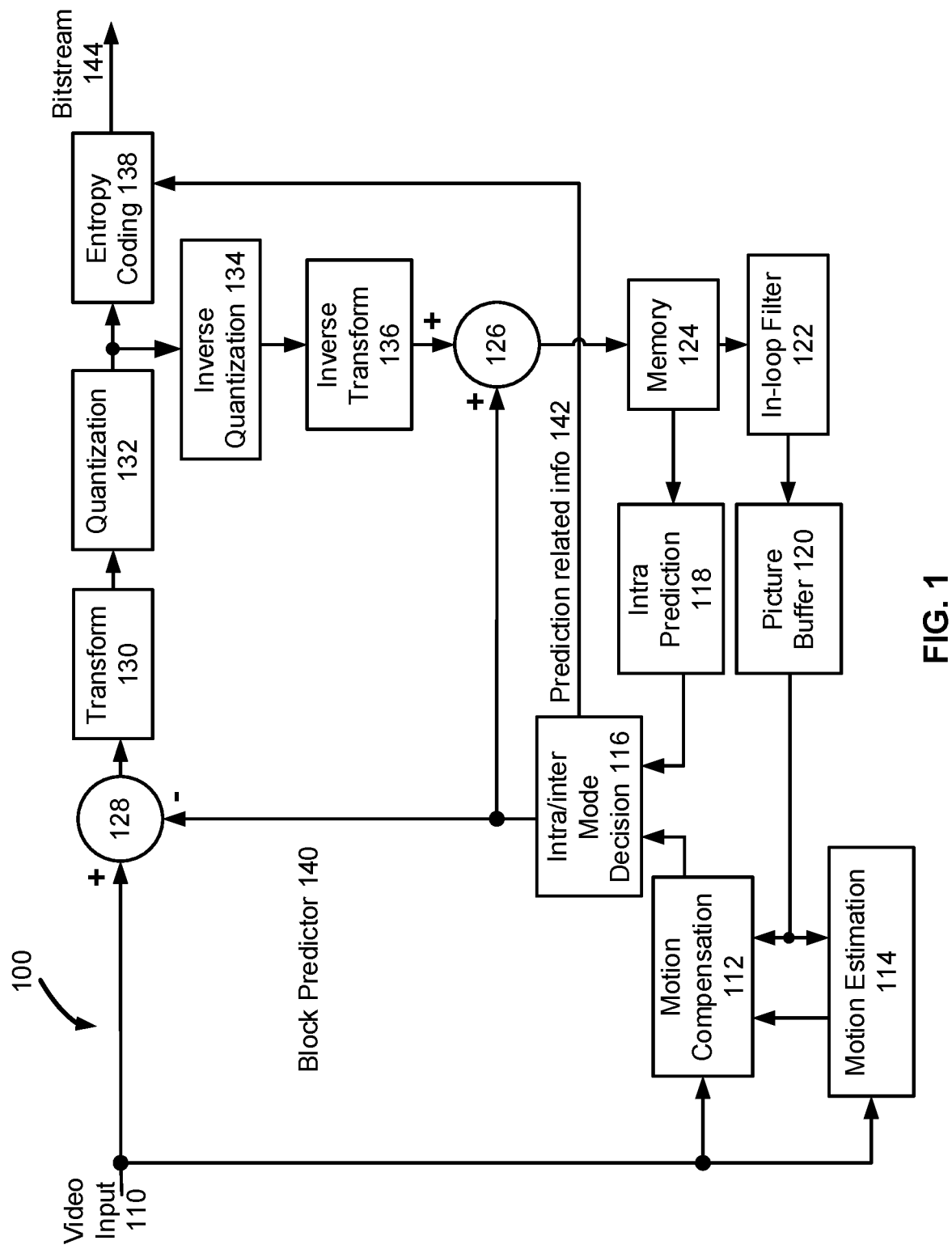
FIG. 1 is a block diagram of an encoder, according to an example of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment," depending on the context.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. One Joint Video Exploration Team (WET) was formed in October 2015 by ITU-T VECG and ISO/IEC MPEG to begin a significant study of advanced technologies that could enable substantial enhancement of coding efficiency. One reference software called the joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called the VVC test model (VTM), was established for demonstrating a reference implementation of the VVC standard.

FIG. 1 shows a general diagram of a block-based video encoder for the VVC. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In the encoder 100, a video frame is partitioned into a plurality of video blocks for processing. For each given video block, a prediction is formed based on either an inter prediction approach or an intra prediction approach.

A prediction residual, representing the difference between a current video block, part of video input 110, and its predictor, part of block predictor 140, is sent to a transform 130 from adder 128. Transform coefficients are then sent from the Transform 130 to a Quantization 132 for entropy reduction. Quantized coefficients are then fed to an Entropy Coding 138 to generate a compressed video bitstream. As shown in FIG. 1, prediction related information 142 from an intra/inter mode decision 116, such as video block partition info, motion vectors (MVs), reference picture index, and intra prediction mode, are also fed through the Entropy Coding 138 and saved into a compressed bitstream 144. Compressed bitstream 144 includes a video bitstream.

In the encoder 100, decoder-related circuitries are also needed in order to reconstruct pixels for the purpose of prediction. First, a prediction residual is reconstructed through an Inverse Quantization 134 and an Inverse Transform 136. This reconstructed prediction residual is combined with a Block Predictor 140 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block is usually signaled by one or more MVs, which indicate the amount and the direction of motion between the current CU and its temporal reference. Further, if multiple reference pictures are supported, one reference picture index is additionally sent, which is used to identify from which reference picture in the reference picture storage, the temporal prediction signal comes from.

Motion estimation 114 intakes video input 110 and a signal from picture buffer 120 and output, to motion compensation 112, a motion estimation signal. Motion compensation 112 intakes video input 110, a signal from picture buffer 120, and motion estimation signal from motion estimation 114 and output to intra/inter mode decision 116, a motion compensation signal.

After spatial and/or temporal prediction is performed, an intra/inter mode decision 116 in the encoder 100 chooses the best prediction mode, for example, based on the rate-distortion optimization method. The block predictor 140 is then subtracted from the current video block, and the resulting prediction residual is de-correlated using the transform 130 and the quantization 132. The resulting quantized residual coefficients are inverse quantized by the inverse quantization 134 and inverse transformed by the inverse transform 136 to form the reconstructed residual, which is then added back to the prediction block to form the reconstructed signal of the CU. Further in-loop filtering 122, such as a deblocking filter, a sample adaptive offset (SAO), and/or an adaptive in-loop filter (ALF) may be applied on the reconstructed CU before it is put in the reference picture storage of the picture buffer 120 and used to code future video blocks. To form the output video bitstream 144, coding mode (inter or intra), prediction mode information, motion information, and quantized residual coefficients are all sent to the entropy coding unit 138 to be further compressed and packed to form the bitstream.

Like HEVC, the VVC is built upon the block-based hybrid video coding framework. FIG. 1 gives the block diagram of a generic block-based hybrid video encoding system.

The input video signal is processed block by block (called coding units (CUs)). In VTM-1.0, a CU can be up to 128×128 pixels. However, different from the HEVC, which partitions blocks only based on quad-trees, in the VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

As shown in FIGS. 3A, 3B, 3C, 3D, and 3E, there are five splitting types, quaternary partitioning, horizontal binary partitioning, vertical binary partitioning, horizontal ternary partitioning, and vertical ternary partitioning.

Figures 3A, 3B, 3C:
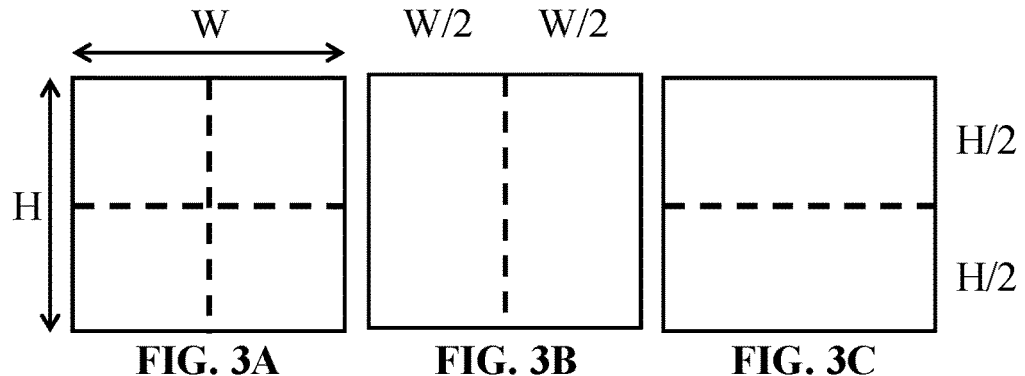
FIG. 3A is a diagram illustrating block partitions in a multi-type tree structure, according to an example of the present disclosure.
FIG. 3B is a diagram illustrating block partitions in a multi-type tree structure, according to an example of the present disclosure.
FIG. 3C is a diagram illustrating block partitions in a multi-type tree structure, according to an example of the present disclosure.

FIG. 3A shows a diagram illustrating block quaternary partition in a multi-type tree structure, in accordance with the present disclosure.

FIG. 3B shows a diagram illustrating block vertical binary partition in a multi-type tree structure, in accordance with the present disclosure.

FIG. 3C shows a diagram illustrating block horizontal binary partition in a multi-type tree structure, in accordance with the present disclosure.

Figures 3D, 3E:
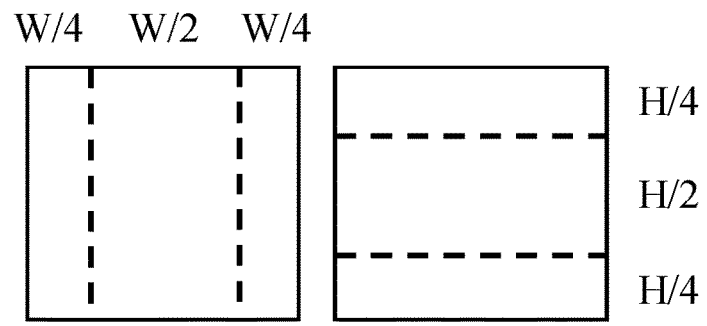
FIG. 3D is a diagram illustrating block partitions in a multi-type tree structure, according to an example of the present disclosure.
FIG. 3E is a diagram illustrating block partitions in a multi-type tree structure, according to an example of the present disclosure.

FIG. 3D shows a diagram illustrating block vertical ternary partition in a multi-type tree structure, in accordance with the present disclosure.

FIG. 3E shows a diagram illustrating block horizontal ternary partition in a multi-type tree structure, in accordance with the present disclosure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs), which indicate the amount and the direction of motion between the current CU and its temporal reference. Also, if multiple reference pictures are supported, one reference picture index is additionally sent, which is used to identify from which reference picture in the reference picture storage the temporal prediction signal comes from. After spatial and/or temporal prediction, the mode decision block in the encoder chooses the best prediction mode, for example, based on the rate-distortion optimization method. The prediction block is then subtracted from the current video block, and the prediction residual is de-correlated using transform and quantized. The quantized residual coefficients are inverse quantized and inverse transformed to form the reconstructed residual, which is then added back to the prediction block to form the reconstructed signal of the CU. Further, in-loop filtering, such as deblocking filter, sample adaptive offset (SAO), and adaptive in-loop filter (ALF) may be applied on the reconstructed CU before it is put in the reference picture store and used to code future video blocks. To form the output video bitstream, coding mode (inter or intra), prediction mode information, motion information, and quantized residual coefficients are all sent to the entropy coding unit to be further compressed and packed to form the bitstream.

Figure 2:
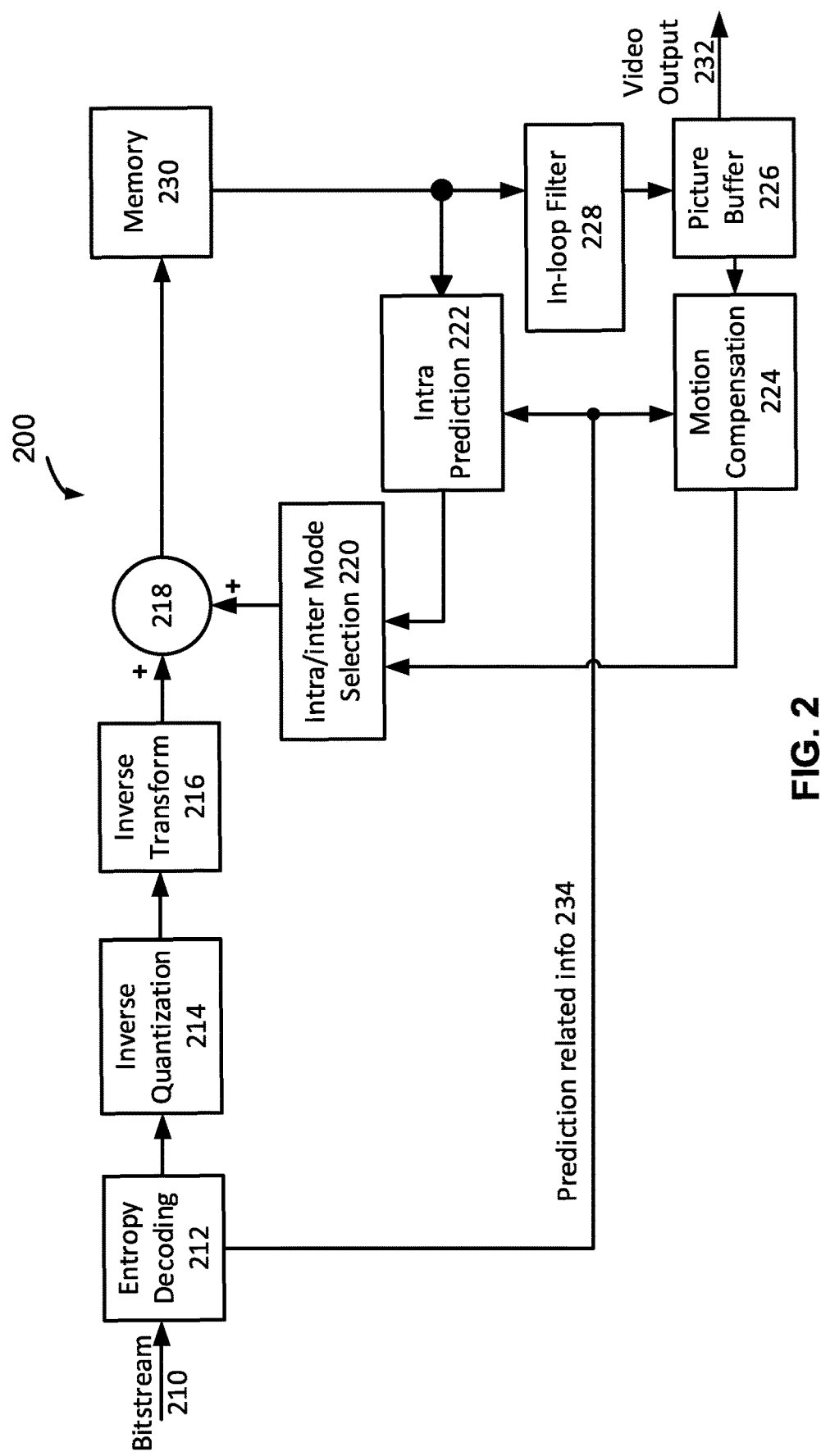
FIG. 2 is a block diagram of a decoder, according to an example of the present disclosure.

FIG. 2 shows a general block diagram of a video decoder for the VVC. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

Decoder 200 is similar to the reconstruction-related section residing in the encoder 100 of FIG. 1. In the decoder 200, an incoming video bitstream 210 is first decoded through an Entropy Decoding 212 to derive quantized coefficient levels and prediction-related information. The quantized coefficient levels are then processed through an Inverse Quantization 214 and an Inverse Transform 216 to obtain a reconstructed prediction residual. A block predictor mechanism, implemented in an Intra/inter Mode Selector 220, is configured to perform either an Intra Prediction 222 or a Motion Compensation 224, based on decoded prediction information. A set of unfiltered reconstructed pixels is obtained by summing up the reconstructed prediction residual from the Inverse Transform 216 and a predictive output generated by the block predictor mechanism, using a summer 218.

The reconstructed block may further go through an In-Loop Filter 228 before it is stored in a Picture Buffer 226, which functions as a reference picture store. The reconstructed video in the Picture Buffer 226 may be sent to drive a display device, as well as used to predict future video blocks. In situations where the In-Loop Filter 228 is turned on, a filtering operation is performed on these reconstructed pixels to derive a final reconstructed Video Output 232.

FIG. 2 gives a general block diagram of a block-based video decoder. The video bitstream is first entropy decoded at entropy decoding unit. The coding mode and prediction information are sent to either the spatial prediction unit (if intra coded) or the temporal prediction unit (if inter-coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture storage. The reconstructed video in reference picture store is then sent out to drive a display device, as well as used to predict future video blocks.

The focus of the disclosure is to improve the signaling method of the symmetrical motion vector difference (SMVD) tool in the VVC. In the following, the existing inter coding technologies that closely relate to the proposed methods in the disclosure are briefly reviewed. After that, the current signaling design that indicates the SMVD mode is discussed. Finally, we describe the proposed signaling methods for the SMVD mode.

Motion Signaling for AMVP Mode

In general, the motion information signaling in the VVC is kept the same as that in the HEVC standard. Specifically, one inter prediction syntax, i.e., inter_pred_idc, is firstly signaled to indicate whether the prediction signal from list L0, L1 or both. For each used reference list, the corresponding reference picture is identified by signaling one reference picture index ref_idx_lx (x=0, 1) for the corresponding reference list, and the corresponding MV is represented by one MVP index mvp_lx_flag (x=0, 1) which is used to select the MV predictor (MVP), followed by its motion vector difference (MVD) between the target MV and the selected MVP. Additionally, one control flag mvd_l1_zero_flag is signaled at the slice level. When the mvd_l1_zero_flag is equal to 0, the L1 MVD is signaled in bitstream; otherwise (when the mvd_l1_zero_flag flag is equal to 1), the L1 MVD is not signaled, and its value is always inferred to zero at encoder and decoder.

Symmetrical MVD Mode

For the regular inter mode in the HEVC, when one coding block is bi-predicted, the prediction signal of the current block is generated as the average of the two prediction blocks that are generated through a pair of motion parameters (including both MVs and reference indices) associated with the reference lists L0 and L1. These motion parameters are signaled in bitstream from encoder to decoder. However, depending on the specific prediction structure (e.g., the hierarchical B structure for random access configuration) that is applied for inter prediction, the motion parameters in list L0 and L1 of one bi-predicted block may be highly correlated. Therefore, in such a case, it may not always be optimal in terms of the coding efficiency to separately signal two different sets of motion parameters, one for each prediction direction. To further improve coding efficiency, the SMVD mode is introduced in the VVC standard to reduce the signaling overhead of bi-prediction. Specifically, to enable the SMVD mode, the following operations are needed:

First, at slice level, variables BiDirPredFlag, RefIdxSymL0, and RefIdxSymL1 are derived as follows: a) The forward reference picture in reference picture list 0 which is nearest to the current picture in display order is searched. If found, RefIdxSymL0 is set equal to the reference index of the located forward reference picture. b) The backward reference picture in reference picture list 1, which is nearest to the current picture in display order is searched. If found, RefIdxSymL1 is set equal to the reference index of the located backward reference picture. c) If both forward and backward pictures are found, BiDirPredFlag is set equal to 1. d) Otherwise, the following applies: i) The backward reference picture in reference picture list 0, which is nearest to the current one in display order is searched. If found, RefIdxSymL0 is set equal to the reference index of the backward reference picture. ii) The forward reference picture in reference picture list 1, which is nearest to the current one in display order is searched. If found, RefIdxSymL1 is set equal to the reference index of the forward reference picture. iii) If both backward and forward pictures are found, BiDirPredFlag is set equal to 1. Otherwise, BiDirPredFlag is set equal to 0.

Second, at CU level, one SMVD control flag, i.e., sym_mvd_flag, is signaled to indicate whether SMVD mode is used for a current CU. This flag is signaled only if the CU is bi-predicted and BiDirPredFlag is equal to 1. When the flag is true, only the L0 and L1 MVP indices, i.e., mvp_l0_flag, mvp_l1_flag, and the L0 motion vector difference, i.e., MVD0, are explicitly signaled from encoder to decoder. The L0 and L1 reference indices that are used to determine the corresponding reference pictures are set equal to RefIdxSymL0 and RefIdxSymL1 for list 0 and list 1, respectively. Additionally, the L1 motion vector difference, i.e., MVD1, is assumed to be symmetrical to the L0 motion vector difference, i.e., the value of MVD1 is set equal to −MVD0. In more details, the final MVs of the current bi-prediction block can be represented as $$(mvx_0, mvy_0) = (mvpx_0 + mvdx_0, mvpy_0 + mvdy_0)$$

$$(mvx_1, mvy_1) = (mvpx_1 - mvdx_0, mvpy_1 - mvdy_0) \qquad (1)$$

where $(mvpx_0, mvpy_0)$ and $(mvpx_1, mvpy_1)$ are the motion vector predictors in list L0 and L1, and $(mvdx_0, mvdy_0)$ is the L0 motion vector difference.

Figures 4A, 4B, 4C:
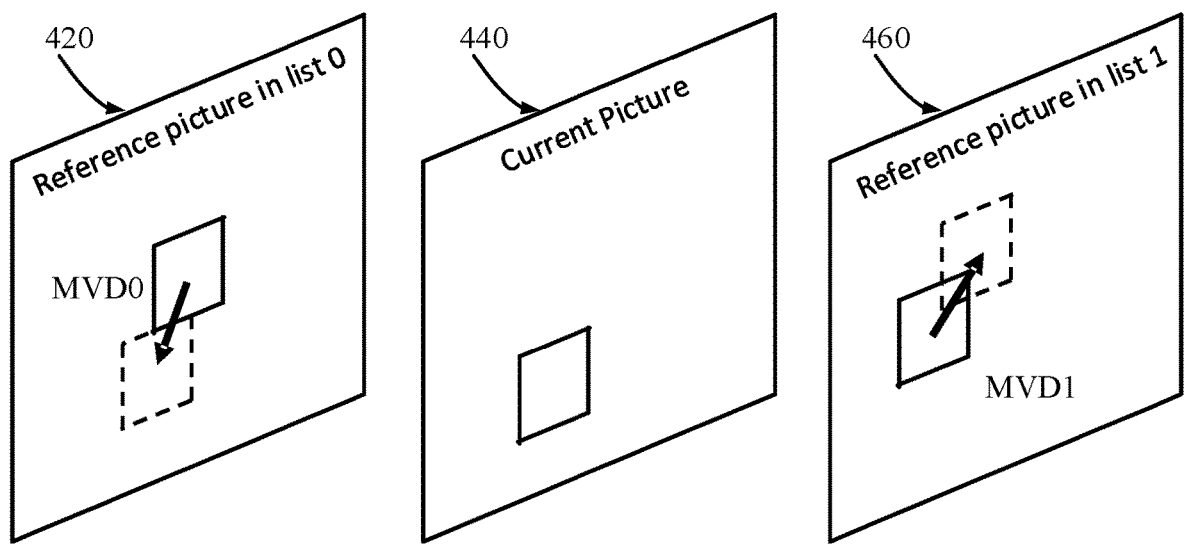
FIG. 4A is a diagram illustration of a symmetrical motion vector difference (SMVD) mode, according to an example of the present disclosure.
FIG. 4B is a diagram illustration of an SMVD mode, according to an example of the present disclosure.
FIG. 4C is a diagram illustration of an SMVD mode, according to an example of the present disclosure.

FIGS. 4A, 4B, and 4C illustrate the SMVD mode.

FIG. 4A shows the reference picture list 0 420 with an MVD0.

FIG. 4B shows the current picture 440.

FIG. 4C shows the reference picture in list 1 460 with an MVD1.

Merge Mode with Motion Vector Differences (MMVD)

In addition to regular merge mode, which derives the motion information of one current block from its spatial/temporal neighbors, one special merge mode, called merge mode with motion vector differences (MMVD), is introduced in VVC and it is signaled by one MMVD flag at coding block level. In the MMVD mode, after one base merge candidate is selected and signaled, additional syntax elements are signaled to indicate the MVDs that are added to the motion of the selected merge candidate. The MMVD syntax elements include a merge candidate flag to select the based merge candidate, a distance index to specify motion magnitude, and a direction index to indicate the MVD direction. In the MMVD mode, one of the first two candidates in the merge list can be selected as a base MV. The merge candidate flag is signaled to specify which one of the first two candidates in the merge list is used.

As shown in the following table, the distance index specifies the MVD magnitude, which is defined based on one set of pre-defined offsets from the starting point.

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

The direction index is used to specify the signs of the signaled MVD. It is noted that the meaning of the MVD sign could be variant according to the starting MVs (i.e., the MVs of the selected base merge candidate). When the starting MVs is a uni-prediction MV or bi-prediction MVs with MVs pointing to two reference pictures whose POCs are both larger than the POC of the current picture, or both smaller than the POC of the current picture, the signaled sign is the sign of the MVD added to the starting MV. When the starting MVs are bi-prediction MVs pointing to two reference pictures with one picture's POC larger than the current picture and the other picture's POC smaller than the current picture, the signaled sign is applied to the L0 MVD, and the opposite value of the signaled sign is applied to the L1 MVD.

TABLE 2

The MVD sign as specified by the direction index

| Direction IDX | 00 | 01 | 10 | 11 |
|---|---|---|---|---|
| x-axis | + | − | N/A | N/A |
| y-axis | N/A | N/A | + | − |

Signaling Methods of the SMVD and the MMVD

As described above, to reduce the signaling overhead of motion parameters, there are two control flags in the VVC standard to indicate whether the L1 MVD syntax elements may be bypassed when parsing the bitstream. Firstly, when the value of the flag mvd_l1_zero_flag in the current slice is equal to 1, the L1 MVDs of all the bi-predicted blocks in the slice will always be inferred as zero without signaling. Secondly, when the slice-level control flag BiDirPredFlag is equal to 1 (i.e., there are both forward and backward reference pictures for the current slice), then at coding block level one additional sym_mvd_flag flag is signaled for every bi-predicted block in the slice. When the SMVD flag is true, only the MVD in list L0 is signaled in the bitstream, and the L1 MVD is inferred to be the opposite value to the L0 MVD.

Due to the different inference rules of the L1 MVD, the mvd_l1_zero_flag flag and the sym_mvd_flag flag cannot take effect at the same time. To address such conflict, two different methods are applied in the Working Draft 5 of VVC and the VVC reference software VTM-5.0 to handle the interaction of those two control flags, which are illustrated as follows:

The SMVD Signaling Design in the Working Draft 5 of VVC

Table 3 illustrates the coding unit syntax in the Working Draft 5 of VVC, where the SMVD related syntax elements are highlighted in bold italic fonts. As can be seen, when SMVD control flag BiDirPredFlag is true (this is indicated by setting the values of RefIdxSymL0 and RefIdxSymL1 greater than −1), the sym_mvd_flag is signaled at coding block level in the current slice to indicate whether the SMVD is applied for each bi-predicted block. Additionally, as shown in Table 3, the mvd_l1_zero_flag flag is used to control the application of the sym_mvd_flag flag on the L1 MVD derivation. Specifically, only when the flag mvd_l1_zero_flag is 0, the flag sym_mvd_flag is used to determine the L1 MVD value. In this case, if sym_mvd_flag has a value of 1, the L1 MVD value is inferred to be the opposite of the L0 MVD. Otherwise, the L1 MVD is explicitly signaled. When the flag mvd_l1_zero_flag is equal to 1, the value of the L1 MVD is always inferred to be zero without considering the value of sym_mvd_flag.

TABLE 3

The coding unit syntax in the Working Draft 5 of VVC

| | Descriptor |
|---|---|
| coding_unit( x0, y0, cbWidth, cbHeight, treeType ) { | |
|   if( sps_smvd_enabled_flag && inter_pred_idc | |
| [ x0 ][ y0 ] = = PRED_BI && | |
|     !inter_affine_flag[ x0 ][ y0 ] && | |
|     *&& RefIdxSymL0 > −1 &&* | |
| *RefIdxSymL1 > −1* ) | |
|     *sym_mvd_flag[ x0 ][ y0 ]* | ae (v) |
|   if( inter_pred_idc[ x0 ][ y0 ] != PRED_L1 ) { | |
|     if( NumRefIdxActive[ 0 ] > 1 | |
|     *&& !sym_mvd_flag[ x0 ][ y0 ]* ) | |
|       ref_idx_l0[ x0 ][ y0 ] | ae (v) |
|     mvd_coding( x0, y0, 0, 0 ) | |
|     if( MotionModelIdc[ x0 ][ y0 ] > 0 ) | |
|       mvd_coding( x0, y0, 0, 1 ) | |
|     if(MotionModelIdc[ x0 ][ y0 ] > 1 ) | |
|       mvd_coding( x0, y0, 0, 2 ) | |
|     mvp_l0_flag[ x0 ][ y0 ] | ae (v) |
|   } else { | |
|     MvdL0[ x0 ][ y0 ][ 0 ] = 0 | |
|     MvdL0[ x0 ][ y0 ][ 1 ] = 0 | |
|   } | |
|   if( inter_pred_idc[ x0 ][ y0 ] != PRED_L0 ) { | |
|     if( NumRefIdxActive[ 1 ] > 1 && | |
|     *!sym_mvd_flag[ x0 ][ y0 ]* ) | |
|       *ref_idx_l1[ x0 ][ y0 ]* | ae (v) |
|     if( *mvd_l1_zero_flag* && inter_pred_idc | |
| [ x0 ][ y0 ] = = PRED_BI ) { | |
|       MvdL1[ x0 ][ y0 ][ 0 ] = 0 | |
|       MvdL1[ x0 ][ y0 ][ 1 ] = 0 | |
|       MvdCpL1[ x0 ][ y0 ][ 0 ][ 0 ] = 0 | |
|       MvdCpL1[ x0 ][ y0 ][ 0 ][ 1 ] = 0 | |
|       MvdCpL1[ x0 ][ y0 ][ 1 ][ 0 ] = 0 | |
|       MvdCpL1[ x0 ][ y0 ][ 1 ][ 1 ] = 0 | |
|       MvdCpL1[ x0 ][ y0 ][ 2 ][ 0 ] = 0 | |
|       MvdCpL1[ x0 ][ y0 ][ 2 ][ 1 ] = 0 | |
|   } else { | |
|     *if( sym_mvd_flag[ x0 ][ y0 ] ) {* | |
|       *MvdL1[ x0 ][ y0 ][ 0 ] = −MvdL0[ x0 ][ y0 ][ 0 ]* | |
|       *MvdL1[ x0 ][ y0 ][ 1 ] = −MvdL0[ x0 ][ y0 ][ 1 ]* | |
|     } else | |

TABLE 3-continued

The coding unit syntax in the Working Draft 5 of VVC

| | Descriptor |
|---|---|
|     mvd_coding( x0, y0, 1, 0 ) | |
|     if( MotionModelIdc[ x0 ][ y0 ] > 0 ) | |
|       mvd_coding( x0, y0, 1, 1 ) | |
|     if(MotionModelIdc[ x0 ][ y0 ] > 1 ) | |
|       mvd_coding( x0, y0, 1, 2 ) | |
|     mvp_l1_flag[ x0 ][ y0 ] | ae (v) |
|   } | |
| } else { | |
|   MvdL1[ x0 ][ y0 ][ 0 ] = 0 | |
|   MvdL1[ x0 ][ y0 ][ 1 ] = 0 | |
| } | |

The SMVD Signaling Design in the VTM-5.0

As shown in Table 3, in the Working Draft 5 of VVC, it allows enabling both the sym_mvd_flag flag and the mvd_l1_zero_flag flag at the same time. When the flag mvd_l1_zero_flag is true, the sym_mvd_flag that is signaled at coding block level is only used to derive the L0 and L1 reference indices, ref_l0_idx and ref_l1_idx, and the L0 MVD is still signaled while the value of the L1 MVD is always inferred to be 0.

Different from the Working Draft 5 of VVC, the SMVD signaling method in the VTM-5.0 disallows the coexistence of the sym_mvd_flag flag and the mvd_l1_zero_flag, i.e., the two flags cannot be true simultaneously. This is done by setting the variable BiDirPredFlag to be 0 when the flag mvd_l1_zero_flag is equal to 1.

Comparison of the Two SMVD Signaling Methods

Based on the above discussion, it can be seen that there is a discrepancy between the Working Draft 5 of VVC and the test model VTM-5.0 on how to handle the SMVD mode when the mvd_l1_zero_flag is true. In general, neither of the two methods is optimal. Firstly, though the method in the Working Draft 5 of VVC allows the coexistence of the sym_mvd_flag flag and the mvd_l1_zero_flag flag, the mvd_l1_zero_flag has higher priority than the sym_mvd_flag in determining the L1 MVD value. Specifically, the sym_mvd_flag can become effective only if the mvd_l1_zero_flag flag is off. If the flag mvd_l1_zero_flag is on, regardless of the value of the sym_mvd_flag, the value of the L1 MVD is always restrained to be zero. In this way, when both the sym_mvd_flag and the mvd_l1_zero_flag are true for one block, it may result in a non-zero L0 MVD (as signaled in the bitstream) and a zero L1 MVD (as indicated by the mvd_l1_zero_flag). Such a case is not in line with the physical meaning of the SMVD mode, i.e., the L0 and L1 MVDs are symmetrical. On the other hand, though the method in the VTM-5.0 can avoid such meaning conflict by disabling the SMVD mode for the slice where the mvd_l1_zero_flag is true, it may potentially lead to coding performance loss due to the fact that the SMVD syntax cannot be applied to any block in the slice.

The MMVD Signaling Design in the VVC

Table 1-1 depicts the merge mode syntax table in the Working Draft 5 of VVC, where the MMVD related syntax elements are highlighted in bold italic fonts. As shown in Table 1-1, one mmvd_merge_flag is firstly signaled to indicate whether the MMVD mode is enabled for the current coding block or not. When the MMVD mode is enabled, one merge candidate flag, i.e., mmvd_cand_flag, is further signaled to select one of the first two candidates in the merge list as the base MV. After that, two syntax elements, namely, mmvd_distance_idx and mmvd_direction_idx, are signal to specify the magnitude and the sign of the MVDs that are applied to the MMVD base MVs.

TABLE 1-1

The merge mode syntax table in the Working Draft 5 of VVC

| | Descriptor |
|---|---|
| merge data( x0, y0, cbWidth, cbHeight ) { | |
| ...... | |
|   if( sps_mmvd_enabled_flag | | cbWidth * cbHeight != 32 ) | |
|     regular_merge_flag[ x0 ][ y0 ] | ae (v) |
|   if ( regular_merge_flag[ x0 ][ y0 ] = = 1 ) { | |
|     if( MaxNumMergeCand > 1 ) | |
|       merge_idx[ x0 ][ y0 ] | ae (v) |
|   } else { | |
|     if( sps_mmvd_enabled_flag && | |
|     cbWidth * cbHeight != 32 ) | |
|       *mmvd_merge_flag[ x0 ][ y0 ]* | *ae(v)* |
|     if( mmvd_merge_flag[ x0 ][ y0 ] = = 1 ) { | |
|       if( MaxNumMergeCand > 1) | |
|         *mmvd_cand_flag[ x0 ][ y0 ]* | *ae(v)* |
|         *mmvd_distance_idx[ x0 ][ y0 ]* | *ae(v)* |
|         *mmvd_direction_idx[ x0 ][ y0 ]* | *ae(v)* |
|     } | |
| ...... | |
| } | |

Comparison Between the SMVD and the MMVD

Based on the above discussion, it can be seen that the MMVD and the SMVD are pretty similar coding tools in the sense that both of the two tools provide syntax shortcuts of motion signaling. The motion parameters in list L0 and L1 of one coding block are closely correlated. Additionally, given the selected base MVs, both of the two modes only signal one MVD, which is then applied to both L0 and L1 direction MVs, based on the assumption that the L0 MVD is symmetrical to the L1 MVD. However, based on the existing Working Draft 5 of VVC, different signaling methods of MVD are used in the two modes. In SMVD mode, MVD syntax is signaled in the same manner as in the inter non-merge mode. In MMVD mode, MVD is signaled based on a set of pre-defined magnitudes and directions, as indicated by the syntax mmvd_distance_idx and mmvd_direction_idx. To achieve better design consistency, it may be more desirable to have one unified MVD signaling method for both the SMVD and the MMVD.

Harmonized Signaling of SMVD and MMVD

In the present disclosure, solutions are provided to better handle the interaction between the SMVD mode and the mvd_l1_zero_flag flag. Specifically, the main aspects of the proposed methods can be summarized as follows:

First, in the first category of the solutions, it is proposed to allow the coexistence of the flag sym_mvd_flag and the flag mvd_l1_zero_flag in a similar manner as the current SMVD signaling method in the Working Draft 5 of VVC. Additionally, modifications are made to ensure that both the physical meanings of the sym_mvd_flag flag and the mvd_l1_zero_flag flag are satisfied.

Second, in the second category of the solutions, it is proposed to exclusively enable the SMVD mode and the slice-level mvd_l1_zero_flag flag such that the sym_mvd_flag flag and the mvd_l1_zero_flag cannot be turned on at the same time.

Solutions for Simultaneous Enabling of Sym_Mvd_Flag and Mvd_l1_Zero_Flag

In this section, various signaling methods are proposed to enable both the sym_mvd_flag and the mvd_l1_zero_flag at the same time.

Solution One: When the mvd_l1_zero_flag flag is true, it is proposed to condition the presence of the L0 MVD based on the value of the sym_mvd_flag. When the sym_mvd_flag is on, then the L0 MVD will not be signaled and be always inferred to be zero; otherwise, i.e., the sym_mvd_flag is off, the L0 MVD will be signaled in bitstream. Table 4 illustrates the modified syntax table based on the proposed method (Solution One), where the newly modified syntax elements are highlighted in bold italic fonts.

TABLE 2

The modified coding unit syntax table after Solution One is applied

| | Descriptor |
|---|---|
| coding_unit( x0, y0, cbWidth, cbHeight, treeType ) { | |
|   if( sps_smvd_enabled_flag && inter_pred_idc | |
| [ x0 ][ y0 ] = = PRED_BI && | |
|     !inter_affine_flag[ x0 ][ y0 ] && | |
| RefIdxSymL0 > −1 && RefIdxSymL1 > −1) | |
|     sym_mvd_flag[ x0 ][ y0 ] | ae (v) |
|   if( inter_pred_idc[ x0 ][ y0 ] != PRED_L1 ) { | |
|     if( NumRefIdxActive [ 0 ] > 1 && | |
|     !sym_mvd_flag[ x0 ][ y0 ] ) | |
|       ref_idx_l0[ x0 ][ y0 ] | ae (v) |
|     *if(sym_mvd_flag[ x0 ][ y0 ])* | |
|     *{* | |
|     *MvdL0[ x0 ][ y0 ][ 0 ] = 0* | |
|     *MvdL0[ x0 ][ y0 ][ 1 ] = 0* | |
|     *} else {* | |
|     mvd_coding( x0, y0, 0, 0 ) | |
|     if( MotionModelIdc[ x0 ][ y0 ] > 0 ) | |
|       mvd_coding( x0, y0, 0, 1 ) | |
|     if(MotionModelIdc[ x0 ][ y0 ] > 1 ) | |
|       mvd_coding( x0, y0, 0, 2 ) | |
|     } | |
|     mvp_l0_flag[ x0 ][ y0 ] | ae (v) |
|   } else { | |
|     MvdL0[ x0 ][ y0 ][ 0 ] = 0 | |
|     MvdL0[ x0 ][ y0 ][ 1 ] = 0 | |
|   } | |
|   if( inter_pred_idc[ x0 ][ y0 ] != PRED_L0 ) { | |
|     if( NumRefIdxActive[ 1 ] > 1 && | |
|     !sym_mvd_flag[ x0 ][ y0 ] ) | |
|       ref_idx_l1[ x0 ][ y0 ] | ae (v) |
|     if( mvd_l1_zero_flag && inter_pred_idc | |
| [ x0 ][ y0 ] = = PRED_BI ) { | |
|       MvdL1[ x0 ][ y0 ][ 0 ] = 0 | |
|       MvdL1[ x0 ][ y0 ][ 1 ] = 0 | |
|       MvdCpL1[ x0 ][ y0 ][ 0 ][ 0 ] = 0 | |
|       MvdCpL1[ x0 ][ y0 ][ 0 ][ 1 ] = 0 | |
|       MvdCpL1[ x0 ][ y0 ][ 1 ][ 0 ] = 0 | |
|       MvdCpL1[ x0 ][ y0 ][ 1 ][ 1 ] = 0 | |
|       MvdCpL1[ x0 ][ y0 ][ 2 ][ 0 ] = 0 | |
|       MvdCpL1[ x0 ][ y0 ][ 2 ][ 1 ] = 0 | |
|     } else { | |
|       if( sym_mvd_flag[ x0 ][ y0 ] ) { | |
|         MvdL1[ x0 ][ y0 ][ 0 ] = −MvdL0[ x0 ][ y0 ][ 0 ] | |
|         MvdL1[ x0 ][ y0 ][ 1 ] = −MvdL0[ x0 ][ y0 ][ 1 ] | |
|       } else | |
|         mvd_coding( x0, y0, 1, 0 ) | |
|       if( MotionModelIdc[ x0 ][ y0 ] > 0 ) | |
|         mvd_coding( x0, y0, 1, 1 ) | |
|       if(MotionModelIdc[ x0 ][ y0 ] > 1 ) | |
|         mvd_coding( x0, y0, 1, 2 ) | |
|       mvp_l1_flag[ x0 ][ y0 ] | ae (v) |
|     } | |
|   } else { | |
|     MvdL1[ x0 ][ y0 ][ 0 ] = 0 | |
|     MvdL1[ x0 ][ y0 ][ 1 ] = 0 | |
|   } | |

As indicated in Table 4, with the proposed method (Solution One), the specific coding scenarios by enabling different combinations of the sym_mvd_flag flag and the mvd_l1_zero_flag flag can be summarized as follows:

When the mvd_l1_zero_flag flag is off (i.e., false) and the sym_mvd_flag flag is on (i.e., true), the sym_mvd_flag flag works in the same way as that in the existing SMVD design in the Working Draft 5 of VVC. That is, the sym_mvd_flag is used to bypass the parsing of the syntax elements for the L0 and L1 reference indices, ref_l0_idx and ref_l1_idx, and the L1 MVD. Meanwhile, the inferred L1 MVD value is always set to be the opposite of the signaled L0 MVD value.

When the mvd_l1_zero_flag flag is on and the sym_mvd_flag flag is off, this case is equal to the default mvd_l1_zero_flag case in the HVEC and VVC where only the L1 MVD is not sent in bitstream and be always inferred to be zero.

When both the mvd_l1_zero_flag flag and the sym_mvd_flag flag are on, the sym_mvd_flag flag is used to bypass the syntax element of the L0 and L1 reference indices ref_l0_idx and ref_l1_idx. The values of these reference indices are derived instead. In this case, both its L0 and L1 MVD are inferred as 0.

When both mvd_l1_zero_flag flag and the sym_mvd_flag flag are off, this case is equal to the normal inter case where all the L0 and L1 reference indices ref_l0_idx and ref_l1_idx, the L0 and L1 MVP indices mvp_l0_idx and mvp_l1_idx and the L0 and L1 MVDs are sent from encoder to decoder.

Solution Two: In the second solution, it is proposed to place the signaling of the L0 MVD syntax in front of the sym_mvd_flag such that when the mvd_l1_zero_flag is true, the sym_mvd_flag is signaled only if the corresponding L0 MVD is equal to 0. Table 5 illustrates the modified syntax table based on the proposed method (Solution Two), where the newly modified syntax elements are highlighted in bold italic fonts, and the removed syntax elements are marked in italic font between two hashtags.

TABLE 5

The modified coding unit syntax table after Solution Two is applied

| | Descriptor |
|---|---|
| coding_unit( x0, y0, cbWidth, cbHeight, treeType ) { | |
|   *if( inter_pred_idc[ x0 ][ y0 ] != PRED_L1 ) {* | |
|     *mvd_coding( x0, y0, 0, 0 )* | |
|     *if( MotionModelIdc[ x0 ][ y0 ] > 0 )* | |
|       *mvd_coding( x0, y0, 0, 1 )* | |
|     *if(MotionModelIdc[ x0 ][ y0 ] > 1 )* | |
|       *mvd_coding( x0, y0, 0, 2 )* | |
|   *} else {* | |
|     *MvdL0[ x0 ][ y0 ][ 0 ] = 0* | |
|     *MvdL0[ x0 ][ y0 ][ 1 ] = 0* | |
|   *}* | |
|   if( sps_smvd_enabled_flag && inter_pred_idc | |
| [ x0 ][ y0 ] = = PRED_BI && | |
|     !inter_affine_flag[ x0 ][ y0 ] && | |
|     *( !mvd_l1_zero_flag* || | |
|   *(MvdL0[ x0 ][ y0 ][ 0 ] ==* | |
| *0 && MvdL0[ x0 ][ y0 ][ 1 ] == 0) )&&* | |
| RefIdxSymL0 > −1 && RefIdxSymL 1 > −1 ) | |
|     sym_mvd_flag[ x0 ][ y0 ] | ae (v) |
|   if( inter_pred_idc[ x0 ][ y0 ] != PRED_L1 ) { | |
|     if( NumRefIdxActive[ 0 ] > 1 && | |
|     !sym_mvd_flag[ x0 ][ y0 ] ) | |
|       ref_idx_l0[ x0 ][ y0 ] | ae (v) |
|     *#mvd_coding( x0, y0, 0, 0 )#* | |
|     *#if( MotionModelIdc[ x0 ][ y0 ] > 0 )#* | |
|       *#mvd_coding( x0, y0, 0, 1 )#* | |
|     *#if(MotionModelIdc[ x0 ][ y0 ] > 1 )#* | |
|       *#mvd_coding( x0, y0, 0, 2 )#* | |
|     mvp_l0_flag[ x0 ][ y0 ] | ae (v) |
|   } *#else { #* | |
|     *#MvdL0[ x0 ][ y0 ][ 0 ] = 0#* | |
|     *#MvdL0[ x0 ][ y0 ][ 1 ] = 0#* | |
|   *#}#* | |
|   if( inter_pred_idc[ x0 ][ y0 ] != PRED_L0 ) { | |

TABLE 5-continued

The modified coding unit syntax table after Solution Two is applied

|  | Descriptor |
|---|---|
| if( NumRefIdxActive[ 1 ] > 1 &&<br>!sym_mvd_flag[ x0 ][ y0 ] )<br>  ref_idx_l1[ x0 ][ y0 ] | ae (v) |
| if( mvd_l1_zero_flag && inter_pred_idc<br>[ x0 ][ y0 ] = = PRED_BI ) {<br>  MvdL1[ x0 ][ y0 ][ 0 ] = 0<br>  MvdL1[ x0 ][ y0 ][ 1 ] = 0<br>  MvdCpL1[ x0 ][ y0 ][ 0 ][ 0 ] = 0<br>  MvdCpL1[ x0 ][ y0 ][ 0 ][ 1 ] = 0<br>  MvdCpL1[ x0 ][ y0 ][ 1 ][ 0 ] = 0<br>  MvdCpL1[ x0 ][ y0 ][ 1 ][ 1 ] = 0<br>  MvdCpL1[ x0 ][ y0 ][ 2 ][ 0 ] = 0<br>  MvdCpL1[ x0 ][ y0 ][ 2 ][ 1 ] = 0<br>} else {<br>  if( sym_mvd_flag[ x0 ][ y0 ] ) {<br>    MvdL1[ x0 ][ y0 ][ 0 ] = −MvdL0<br>    [ x0 ][ y0 ][ 0 ]<br>    MvdL1[ x0 ][ y0 ][ 1 ] = −MvdL0<br>    [ x0 ][ y0 ][ 1 ]<br>  } else<br>    mvd_coding( x0, y0, 1, 0 )<br>  if( MotionModelIdc[ x0 ][ y0 ] > 0 )<br>    mvd_coding( x0, y0, 1, 1 )<br>  if(MotionModelIdc[ x0 ][ y0 ] > 1 )<br>    mvd_coding( x0, y0, 1, 2 )<br>  mvp_l1_flag[ x0 ][ y0 ] | ae (v) |
| }<br>} else {<br>  MvdL1[ x0 ][ y0 ][ 0 ] = 0<br>  MvdL1[ x0 ][ y0 ][ 1 ] = 0<br>} | |

It should be mentioned that because in Solution One and Solution Two the value of the L0 MVD is forced to be zero when enabling both the sym_mvd_flag flag and the mvd_l1_zero_flag flag, both of two solutions can solve the definition conflict issue of the SMVD mode in the Working Draft 5 of VVC.

Solution Three: In the third solution, when determining the value of the L1 MVD, it is proposed to check the sym_mvd_flag prior to the mvd_l1_zero_flag flag. Table 6 illustrates the modified syntax table based on the proposed method (Solution Three), where the newly modified syntax elements are highlighted in bold italic fonts, and the removed syntax elements are marked in italic font between two hashtags. As shown in Table 6, different from the signaling method in the Working Draft 5 of VVC where the mvd_l1_zero_flag flag is checked before the sym_mvd_flag flag, the sym_mvd_flag flag has higher priority than that of the mvd_l1_zero_flag on deciding the L1 MVD in the proposed method. Specifically, in such a method, the mvfd_l1_zero_flag can only determine the L1 MVD (i.e., setting the L1 MVD to be zero) value when the sym_mvd_flag is turned off for the current block. When the sym_mvd_flag is on for the current block, no matter whether the mvd_l1_zero_flag is on or off, the L1 MVD will be always be set to the opposite of the MVD value in list L0. Additionally, it is worthy to be mentioned that different from the first two solutions, the third solution may have physical meaning conflict issue of the mvd_l1_zero_flag. Specifically, when both the sym_mvd_flag flag and the mvd_l1_zero_flag are true for the current block, it may result in a non-zero L0 MVD and a non-zero L1 MVD, which is not fully aligned with the definition of the mvd_l1_zero_flag flag.

TABLE 6

The modified coding unit syntax table after Solution Three is applied

|  | Descriptor |
|---|---|
| coding_unit( x0, y0, cbWidth, cbHeight, treeType ) {<br>  if( sps_smvd_enabled_flag && inter_pred_idc<br>  [ x0 ][ y0 ] = = PRED_BI &&<br>  !inter_affine_flag[ x0 ][ y0 ] &&<br>  RefIdxSymL0 > −1 &&<br>  RefIdxSymL1 > −1 )<br>    sym_mvd_flag[ x0 ][ y0 ] | ae (v) |
| if( inter_pred_idc[ x0 ][ y0 ] != PRED_L1 ) {<br>  if( NumRefIdxActive [ 0 ] > 1 &&<br>  !sym_mvd_flag[ x0 ][ y0 ] )<br>    ref_idx_l0[ x0 ][ y0 ] | ae (v) |
|   mvd_coding( x0, y0, 0, 0 )<br>  if( MotionModelIdc[ x0 ][ y0 ] > 0 )<br>    mvd_coding( x0, y0, 0, 1 )<br>  if(MotionModelIdc[ x0 ][ y0 ] > 1 )<br>    mvd_coding( x0, y0, 0, 2 )<br>  mvp_l0_flag[ x0 ][ y0 ] | ae (v) |
| } else {<br>  MvdL0[ x0 ][ y0 ][ 0 ] = 0<br>  MvdL0[ x0 ][ y0 ][ 1 ] = 0<br>}<br>if( inter_pred_idc[ x0 ][ y0 ] != PRED_L0 ) {<br>  if( NumRefIdxActive [ 1 ] > 1 &&<br>  !sym_mvd_flag[ x0 ][ y0 ] )<br>    ref_idx_l1[ x0 ][ y0 ] | ae (v) |
| if( #mvd_l1_zero_flag #<br>  sym_mvd_flag[ x0 ][ y0 ] &&<br>  inter_pred_idc[ x0 ][ y0 ] = = PRED_BI ) {<br>    #MvdL1[ x0 ][ y0 ][ 0 ] = 0#<br>    #MvdL1[ x0 ][ y0 ][ 1 ] = 0#<br>    #MvdCpL1[ x0 ][ y0 ][ 0 ][ 0 ] = 0#<br>    #MvdCpL1[ x0 ][ y0 ][ 0 ][ 1 ] = 0#<br>    #MvdCpL1[ x0 ][ y0 ][ 1 ][ 0 ] = 0#<br>    #MvdCpL1[ x0 ][ y0 ][ 1 ][ 1 ] = 0#<br>    #MvdCpL1[ x0 ][ y0 ][ 2 ][ 0 ] = 0#<br>    #MvdCpL1[ x0 ][ y0 ][ 2 ][ 1 ] = 0#<br>    MvdL1[ x0 ][ y0 ][ 0 ] =−MvdL0[ x0 ][ y0 ][ 0 ]<br>    MvdL1[ x0 ][ y0 ][ 1 ] =−MvdL0[ x0 ][ y0 ][ 1 ]<br>} else {<br>  If( #sym_mvd_flag[ x0 ][ y0 ]#<br>  mvp_l1_zero_flag {<br>    #MvdL1[ x0 ][ y0 ][ 0 ] = −MvdL0<br>    [ x0 ][ y0 ][ 0 ]#<br>    #MvdL1[ x0 ][ y0 ][ 1 ] = −MvdL0<br>    [ x0 ][ y0 ][ 1 ]#<br>    MvdL1[ x0 ][ y0 ][ 0 ] = 0<br>    MvdL1[ x0 ][ y0 ][ 1 ] = 0<br>    MvdCpL1[ x0 ][ y0 ][ 0 ][ 0 ] = 0<br>    MvdCpL1[ x0 ][ y0 ][ 0 ][ 1 ] = 0<br>    MvdCpL1[ x0 ][ y0 ][ 1 ][ 0 ] = 0<br>    MvdCpL1[ x0 ][ y0 ][ 1 ][ 1 ] = 0<br>    MvdCpL1[ x0 ][ y0 ][ 2 ][ 0 ] = 0<br>    MvdCpL1[ x0 ][ y0 ][ 2 ][ 1 ] = 0<br>  } else {<br>    mvd_coding( x0, y0, 1, 0 )<br>    if( MotionModelIdc[ x0 ][ y0 ] > 0 )<br>      mvd_coding( x0, y0, 1, 1 )<br>    if(MotionModelIdc[ x0 ][ y0 ] > 1 )<br>      mvd_coding( x0, y0, 1, 2 )<br>  }<br>  mvp_l1_flag[ x0 ][ y0 ] | ae (v) |
| }<br>} else {<br>  MvdL1[ x0 ][ y0 ][ 0 ] = 0<br>  MvdL1[ x0 ][ y0 ][ 1 ] = 0<br>} | |

Solution Four: in the fourth solution, it is proposed to simply extend the current syntax design in the Working Draft 5 of VVC to the VTM-5.0, i.e., Table 3, for the SMVD mode.

Exclusive Enabling of the SMVD Mode and the Mvd_l1_Zero_Flag

In this section, it is proposed to exclusively enable the SMVD mode and the mvd_l1_zero_flag such that the sym_mvd_flag flag and the mvd_l1_zero_flag flag cannot be turned on at the same time. Specifically, two methods can be applied. In a method of the present disclosure, it is proposed to apply the SMVD signaling method that is used in the VTM-5.0, i.e., when determining whether to enable/disable the SMVD mode at slice level, the slice-level control flag BiDirPredFlag is always set equal to be zero if mvd_l1_zero_flag is true such that the signaling of the sym_mvd_flag is skipped and inferred to be zero. As a result, the SMVD mode is disabled for all the coding blocks within the current slice.

In a method of the present disclosure, it is proposed to keep the derivation of the variable BiDirPredFlag unchanged, as described in the section "symmetrical MVD mode." However, the value of the BiDirPredFlag is used to condition the presence of the mvd_l1_zero_flag in the slice header. When the variable BiDirPredFlag is equal to 0, the mvd_l1_zero_flag is signaled. Otherwise, when the variable BiDirPredFlag is equal to 1, the mvd_l1_zero_flag is not sent but always inferred to be zero. As a result, the zero MVD inference rule is always disabled for the L1 MVD signaling when the variable BiDirPredFlag is equal to 1. Table 7 illustrates the modified slice header syntax table based on the proposed method of the present disclosure, where the newly modified syntax elements are highlighted in bold italic fonts.

TABLE 7

The modified slice header syntax table

| | Descriptor |
|---|---|
| slice header( ) { | |
| ...... | |
| if( slice type = = B | |
| && (*RefIdxSymL0* == *−1* && *RefIdxSymL1* ==*−1*)) | |
| mvd_l1_zero_flag | u (1) |
| if( cabac_init_present_flag ) | |
| cabac_init_flag | u (1) |
| ...... | |
| } | |

MVD Scaling of the SMVD Mode

In current SMVD design, the L1 motion vector difference, i.e., MVD1, is assumed to be symmetrical to the L0 motion vector difference, i.e., the value of MVD1 is set equal to −MVD0. This assumption holds only when the picture order count (POC) difference (or termed POC distance) between the current picture and the L0 reference picture, $POC_{cur}-POC_{L0}$ are identical to the picture order count (POC) difference between the L1 reference picture and the current picture $POC_{L1}-POC_{cur}$.

In this disclosure, MVD scaling is enabled for the SMVD mode to provide more accurate MVD derivation for the SMVD mode when the POC distances of the L0 reference picture and the L1 reference picture are different. In one solution, only the L0 MVD is signaled for the SMVD mode, and L1 MVD is scaled according to the POC distances $POC_{cur}-POC_{L0}$ and $POC_{cur}-POC_{L0}$ in the same manner of the MVP scaling in HEVC. In another solution, the MVD is signaled to one designated reference list (e.g., list 0 or list 1) and the MVD for the other reference list is scaled according to the POC distances $POC_{cur}-POC_{L0}$ and $POC_{cur}-POC_{L0}$ in the same manner of the MVP scaling in HEVC. The designated reference list could be signaled at slice level, tile level, tiles group level, picture level (e.g., picture parameter set), or sequence level (e.g., sequence parameter set). In yet another solution, the designated reference list could be derived based on some predetermined rules at slice level, tile level, tiles group level, picture level (e.g., picture parameter set), or sequence level (e.g., sequence parameter set). In one example, the designated reference list is derived using the rules below.

If the absolute value of ($POC_{cur}-POC_{L0}$) is greater than the absolute value of ($POC_{cur}-POC_{L1}$), the reference list 1 is used as the designated reference list for SMVD; otherwise, the reference list 0 is used as the designated reference list.

Harmonization of the Signaling Methods of the SMVD and the MMVD

As discussed earlier, the current signaling designs of the SMVD mode and the MMVD mode are not unified with regards to how to signal the MVD that is applied to the corresponding base MVs. Specifically, the MVD of the SMVD mode is indicated based on the syntax elements of the MVD signaling of the inter non-merge mode. The MVD of the MMVD mode is indicated based on one set of pre-defined magnitudes and directions specified by the newly introduced syntax elements mmvd_distance_idx and mmvd_direction_idx. To achieve one more unified design, two methods are proposed in the disclosure to harmonize the MVD signaling methods of the SMVD mode and the MMVD mode.

Figure 5:
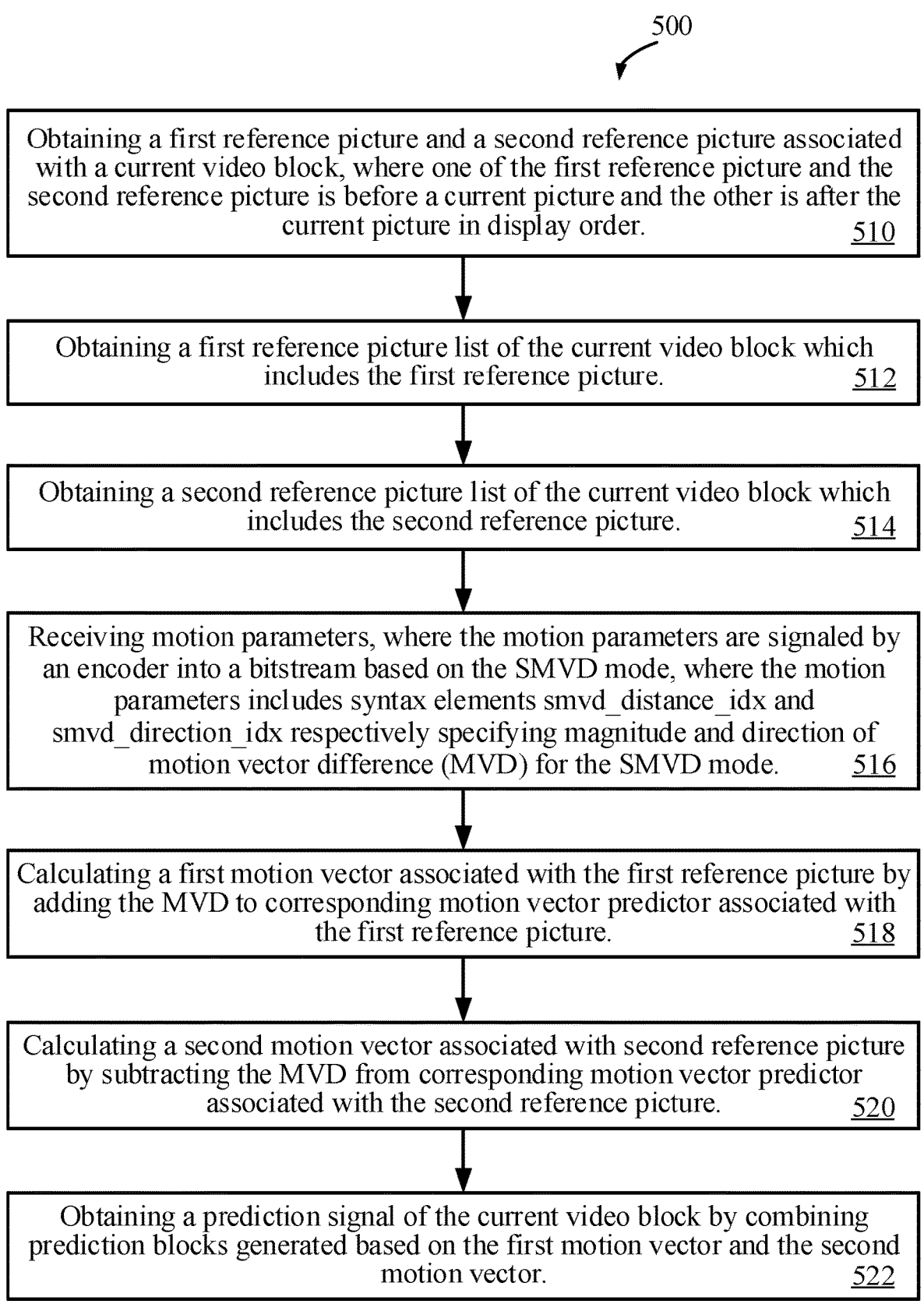
FIG. 5 is a computer implemented method for SMVD mode, according to the present disclosure.

FIG. 5 shows a computer implemented method for SMVD mode in accordance with the present disclosure. The method may be, for example, applied to a decoder.

In step 510, the decoder may obtain a first reference picture and a second reference picture associated with a current video block. One of the first reference picture and the second reference picture is before a current picture and the other is after the current picture in display order. For example, the first reference picture could be before the current picture when the second reference picture is after the current picture or the first reference picture could be after the current picture when the second reference picture is before the current picture.

In step 512, the decoder may obtain a first reference picture list of the current video block which includes the first reference picture.

In step 514, the decoder may obtain a second reference picture list of the current video block which includes the second reference picture.

In step 516, the decoder may receive motion parameters. The motion parameters are signaled by an encoder into a bitstream based on the SMVD mode. The motion parameters include syntax elements smvd_distance_idx and smvd_direction_idx respectively specifying magnitude and direction of motion vector difference (MVD) for the SMVD mode.

In step 518, the decoder may calculate a first motion vector associated with the first reference picture by adding the MVD to corresponding motion vector predictor associated with the first reference picture.

In step 520, the decoder may calculate a second motion vector associated with second reference picture by subtracting the MVD from corresponding motion vector predictor associated with the second reference picture.

In step 522, the decoder may obtain a prediction signal of the current video block by combining the prediction blocks generated based on the first motion vector and the second motion vector. For example, the decoder may obtain the prediction signal of the current video block by using an average or a weighted average of prediction blocks generated based on the first motion vector and the second motion vector. Other ways of combining the prediction blocks may include Bidirectional Optical Flow (BDOF), Prediction Refinement with Optical Flow (PROF), or methods based on filtering operations.

In the first method of the present disclosure, an electronic device may use the MVD signaling syntax of the MMVD mode to indicate the MVD value of the SMVD mode. Table 8 shows the corresponding coding unit syntax table according to this method, where the newly modified syntax elements are highlighted in bold italic fonts. As shown in the table, two new syntax elements, namely smvd_distance_idx and smvd_direction_idx, are introduced. Similar to the MMVD mode, the two syntax elements are used to specify the magnitude and the direction of the MVD for SMVD. In one example, the electronic device may use the same set of pre-defined magnitudes and directions of the MMVD mode as defined in the section "Merge mode with motion vector differences (MMVD)" for the SMVD mode. In another example, a different set of pre-defined magnitudes and directions from those used for the MMVD mode may be used to signal the MVD of the SMVD mode. Such pre-defined magnitudes and directions for MVD may always be fixed, and therefore there is no need to signal them from an encoder to decoder. Alternatively, they may also be variable and signaled from an encoder to a decoder. According to the method of the disclosure, different signaling methods may be used. In one example, an encoder may generate these values on the fly and signal them in the bitstream to a decoder. They can be signaled at different levels, such as sequence parameter set (SPS), picture parameter set (PPS), or slice header. In another example, multiple sets of magnitudes and directions of MVD may be predetermined and signaled at a higher level, e.g., in SPS, while at a lower level such as in each picture, slice, and/or tile, a specific set may be selected and used. In this case, only the index value of the selected set needs to be signaled at the lower level.

TABLE 8

The modified coding unit syntax table
after using the MMVD signaling for the SMVD

| | Descriptor |
|---|---|
| coding_unit( x0, y0, cbWidth, cbHeight, treeType ) { | |
|   if( sps_smvd_enabled_flag && inter_pred_idc | |
|   [ x0 ][ y0 ] = = PRED_BI && | |
|     !inter_affine_flag[ x0 ][ y0 ] && | |
|   RefIdxSymL0 > −1 && RefIdxSymL1 > −1 ) | |
|     sym_mvd_flag[ x0 ][ y0 ] | ae (v) |
|   if( inter_pred_idc[ x0 ][ y0 ] != PRED_L1 ) { | |
|     if( NumRefIdxActive[ 0 ] > 1 && | |
|     !sym_mvd_flag[ x0 ][ y0 ] ) | |
|       ref_idx_l0[ x0 ][ y0 ] | ae (v) |
|     *if(sym_mvd_flag[ x0 ][ y0 ]) {* | |
|     *{* | |
|       *smvd_distance_idx[ x0 ][ y0 ]* | *ae(v)* |
|       *smvd_direction_idx[ x0 ][ y0 ]* | *ae(v)* |
|     *}else* | |
|     mvd_coding( x0, y0, 0, 0 ) | |
|     if( MotionModelIdc[ x0 ][ y0 ] > 0 ) | |
|       mvd_coding( x0, y0, 0, 1 ) | |
|     if(MotionModelIdc[ x0 ][ y0 ] > 1 ) | |
|       mvd_coding( x0, y0, 0, 2 ) | |
|     mvp_l0_flag[ x0 ][ y0 ] | ae (v) |
|   } else { | |
|     MvdL0[ x0 ][ y0 ][ 0 ] = 0 | |
|     MvdL0[ x0 ][ y0 ][ 1 ] = 0 | |
|   } | |
|   if( inter_pred_idc[ x0 ][ y0 ] != PRED_L0 ) { | |
|     if( NumRefIdxActive[ 1 ] > 1 && | |
|     !sym_mvd_flag[ x0 ][ y0 ] ) | |
|       ref_idx_l1[ x0 ][ y0 ] | ae (v) |
|   if( mvd_l1_zero_flag && inter_pred_idc | |

TABLE 8-continued

The modified coding unit syntax table
after using the MMVD signaling for the SMVD

| | Descriptor |
|---|---|
| [ x0 ][ y0 ] = = PRED_BI ) { | |
|   MvdL1[ x0 ][ y0 ][ 0 ] = 0 | |
|   MvdL1[ x0 ][ y0 ][ 1 ] = 0 | |
|   MvdCpL1[ x0 ][ y0 ][ 0 ][ 0 ] = 0 | |
|   MvdCpL1[ x0 ][ y0 ][ 0 ][ 1 ] = 0 | |
|   MvdCpL1[ x0 ][ y0 ][ 1 ][ 0 ] = 0 | |
|   MvdCpL1[ x0 ][ y0 ][ 1 ][ 1 ] = 0 | |
|   MvdCpL1[ x0 ][ y0 ][ 2 ][ 0 ] = 0 | |
|   MvdCpL1[ x0 ][ y0 ][ 2 ][ 1 ] = 0 | |
| } else { | |
|   if( sym_mvd_flag[ x0 ][ y0 ] ) { | |
|     MvdL1[ x0 ][ y0 ][ 0 ] = −MvdL0 | |
|     [ x0 ][ y0 ][ 0 ] | |
|     MvdL1[ x0 ][ y0 ][ 1 ] = −MvdL0 | |
|     [ x0 ][ y0 ][ 1 ] | |
|   } else | |
|     mvd_coding( x0, y0, 1, 0 ) | |
|   if( MotionModelIdc[ x0 ][ y0 ] > 0 ) | |
|     mvd_coding( x0, y0, 1, 1 ) | |
|   if(MotionModelIdc[ x0 ][ y0 ] > 1 ) | |
|     mvd_coding( x0, y0, 1, 2 ) | |
|   mvp_l1_flag[ x0 ][ y0 ] | ae (v) |
| } | |
| } else { | |
|   MvdL1[ x0 ][ y0 ][ 0 ] = 0 | |
|   MvdL1[ x0 ][ y0 ][ 1 ] = 0 | |
| } | |

Figure 6:
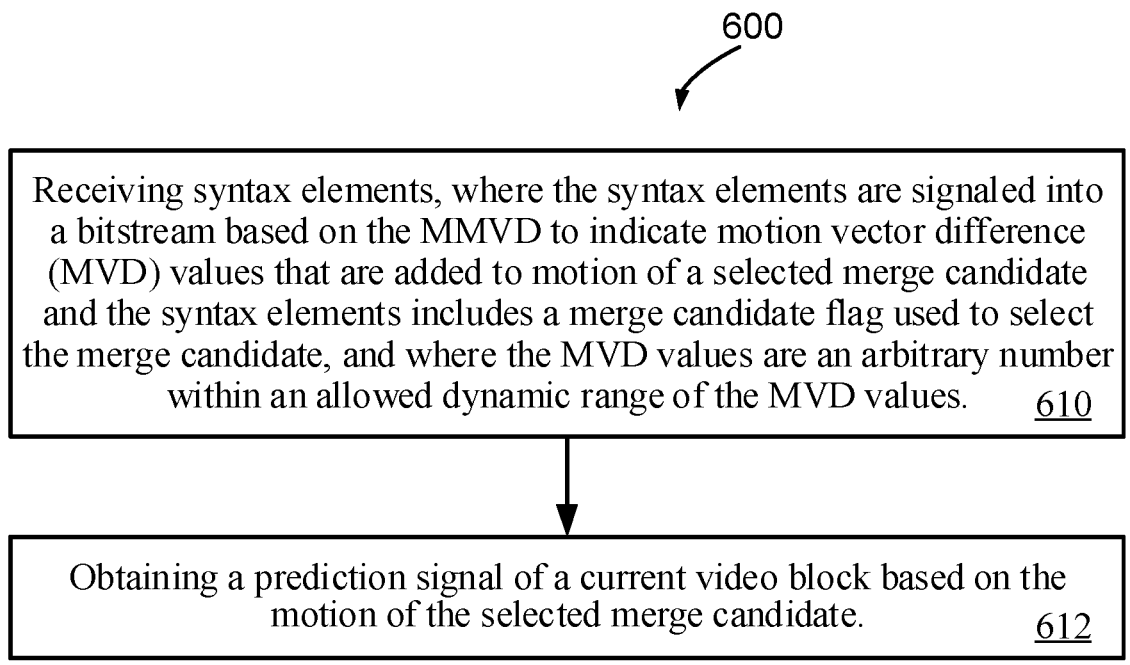
FIG. 6 is a computer implemented method for merge mode with motion vector differences (MMVD), according to the present disclosure.

FIG. 6 shows a computer implemented method for merge mode with motion vector differences (MMVD) in accordance with the present disclosure.

In step 610, receiving syntax elements. The syntax elements are signaled into a bitstream based on the MMVD to indicate motion vector difference (MVD) values that are added to motion of a selected merge candidate and the syntax elements include a merge candidate flag used to select the merge candidate. The MVD values include one or more arbitrary numbers within an allowed dynamic range of the MVD values In step 620, obtaining a prediction signal of a current video block based on the motion of the selected merge candidate In the second method of the disclosure, an electronic device may use the MVD signaling syntax of the SMVD mode to indicate the MVD value of the MMVD mode. Table 9 shows the modified merge mode syntax table when the second method is applied where the newly modified syntax elements are highlighted in bold italic fonts, and the removed syntax elements are marked in italic font between two hashtags. As shown in Table 9, instead of using a given set of pre-defined MVD values, the MVD of the MMVD is specified as one arbitrary number within the allowed dynamic range of the MVD values in the VVC (i.e., 16-bit signed integer).

TABLE 9

The modified coding unit syntax table
after using the SMVD signaling for the MMVD

| | Descriptor |
|---|---|
| merge_data( x0, y0, cbWidth, cbHeight) { | |
|   ...... | |
|   if( sps_mmvd_enabled_flag \| \| | |
|   cbWidth * cbHeight != 32 ) | |
|     regular_merge_flag[ x0 ][ y0 ] | ae (v) |

TABLE 9-continued

The modified coding unit syntax table
after using the SMVD signaling for the MMVD

| | Descriptor |
|---|---|
| if ( regular_merge_flag[ x0 ][ y0 ] = = 1 ) { | |
|   if( MaxNumMergeCand > 1) | |
|     merge_idx[ x0 ][ y0 ] | ae (v) |
| }else { | |
|   if( sps_mmvd_enabled_flag && | |
|   cbWidth * cbHeight != 32 ) | |
|     mmvd_merge_flag[ x0 ][ y0 ] | ae (v) |
|   if( mmvd_merge_flag[ x0 ][ y0 ] = = 1 ) { | |
|     if( MaxNumMergeCand > 1 ) | |
|       mmvd_cand_flag[ x0 ][ y0 ] | ae (v) |
|     mvd_coding( x0, y0, 0, 0 ) | |
|     #mmvd_distance_idx[ x0 ][ y0 ]# | #ae (v) # |
|     #mmvd_direction_idx[ x0 ][ y0 ]# | #ae (v) # |
|   } | |
|   ...... | |
| } | |

Figure 7:
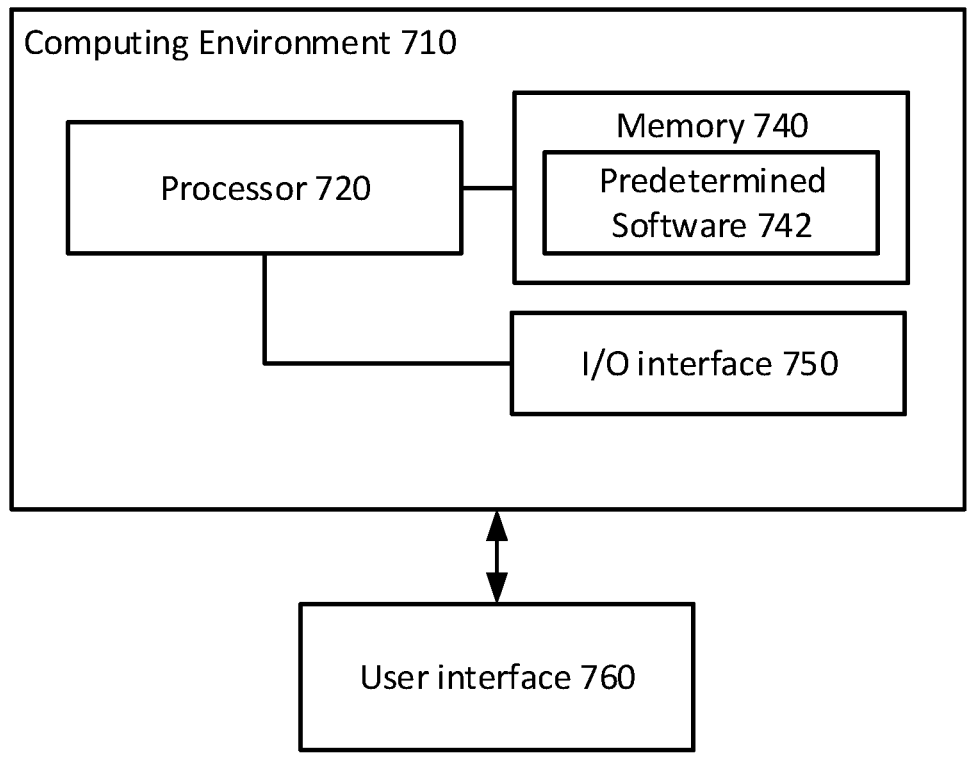
FIG. 7 is a diagram illustrating a computing environment coupled with a user interface, according to an example of the present disclosure.

FIG. 7 shows a computing environment 710 coupled with a user interface 760. The computing environment 710 can be part of a data processing server. The computing environment 710 includes processor 720, memory 740, and I/O interface 750.

The processor 720 typically controls overall operations of the computing environment 710, such as the operations associated with the display, data acquisition, data communications, and image processing. The processor 720 may include one or more processors to execute instructions to perform all or some of the steps in the above-described methods. Moreover, the processor 720 may include one or more modules that facilitate the interaction between the processor 720 and other components. The processor may be a Central Processing Unit (CPU), a microprocessor, a single chip machine, a GPU, or the like.

The memory 740 is configured to store various types of data to support the operation of the computing environment 710. Memory 740 may include predetermine software 742. Examples of such data comprise instructions for any applications or methods operated on the computing environment 710, video datasets, image data, etc. The memory 740 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 750 provides an interface between the processor 720 and peripheral interface modules, such as a keyboard, a click wheel, buttons, and the like. The buttons may include but are not limited to, a home button, a start scan button, and a stop scan button. The I/O interface 750 can be coupled with an encoder and decoder.

In some embodiments, there is also provided a non-transitory computer-readable storage medium comprising a plurality of programs, such as comprised in the memory 740, executable by the processor 720 in the computing environment 710, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 710 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A computer implemented method for symmetrical motion vector difference (SMVD) mode, comprising:

obtaining, at a decoder, a first reference picture and a second reference picture associated with a current video block, wherein one of the first reference picture and the second reference picture is before a current picture and the other is after the current picture in display order;

receiving, by the decoder, motion parameters, wherein the motion parameters are signaled by an encoder into a bitstream based on the SMVD mode, wherein the motion parameters specify magnitude and direction of motion vector difference (MVD) for the SMVD mode in a set of allowed MVD magnitudes and directions, wherein values of the allowed MVD magnitudes and directions in the set are generated at the encoder and signaled from the encoder;

calculating, at the decoder, a first motion vector associated with the first reference picture by adding the MVD defined by the magnitude and the direction to corresponding motion vector predictor associated with the first reference picture;

calculating, at the decoder, a second motion vector associated with second reference picture by subtracting the MVD defined by the magnitude and the direction from corresponding motion vector predictor associated with the second reference picture; and obtaining, at the decoder, a prediction signal of the current video block by combining the prediction blocks generated based on the first motion vector and the second motion vector.

2. The computer implemented method of claim 1, wherein receiving, by the decoder, the motion parameters comprises:

receiving, by the decoder, a sym_mvd_flag flag, wherein the sym_mvd_flag flag signals that the SMVD mode is being used for the current video block; and receiving, at the decoder, syntax elements smvd_distance_idx and smvd_direction_idx syntax elements to respectively specify the magnitude and direction of the MVD when the SMVD mode is used for the current video block.

3. The computer implemented method of claim 2, wherein the set of allowed MVD magnitudes comprises ¼, ½, 1, 2, and 4-integer sample and the set of allowed MVD directions comprises positive x-axis, negative x-axis, positive y-axis, and negative y-axis.

4. The computer implemented method of claim 1, further comprising:
receiving, at the decoder, the set of allowed MVD magnitudes and directions, wherein the set of allowed MVD magnitudes and directions are signaled at slice header level.

5. The computer implemented method of claim 1, further comprising:
receiving, at the decoder, multiple sets of allowed MVD magnitudes and directions, wherein the multiple sets of allowed MVD magnitudes and directions are generated at the encoder and signaled at sequence parameter set (SPS) level.

6. A computing device for decoding a video signal comprising:
one or more processors;
a non-transitory computer-readable storage medium storing instructions executable by the one or more processors, wherein the one or more processors are configured to:
obtain a first reference picture and a second reference picture associated with a current video block, wherein one of the first reference picture and the second reference picture is before a current picture and the other is after the current picture in display order;
receive motion parameters, wherein the motion parameters are signaled by an encoder into a bitstream based on a symmetrical motion vector difference (SMVD) mode, wherein the motion parameters specify magnitude and direction of motion vector difference (MVD) for the SMVD mode in a set of allowed MVD magnitudes and directions, wherein values of the allowed MVD magnitudes and directions in the set are generated at the encoder and signaled from the encoder;
calculate a first motion vector associated with the first reference picture by adding the MVD defined by the magnitude and the direction to corresponding motion vector predictor associated with the first reference picture;
calculate a second motion vector associated with second reference picture by subtracting the MVD defined by the magnitude and the direction from corresponding motion vector predictor associated with the second reference picture; and
obtain a prediction signal of the current video block by combining the prediction blocks generated based on the first motion vector and the second motion vector.

7. The computing device of claim 6, wherein the one or more processors configured to receive the motion parameters are further configured to:
receive a sym_mvd_flag flag, wherein the sym_mvd_flag flag signals that the SMVD mode is being used for the current video block; and
receive syntax elements smvd_distance_idx and smvd_direction_idx syntax elements to respectively specify the magnitude and direction of the MVD when the SMVD mode is used for the current video block.

8. The computing device of claim 7, wherein the set of allowed MVD magnitudes comprises ¼, ½, 1, 2, and 4-integer sample and the set of allowed MVD directions comprises positive x-axis, negative x-axis, positive y-axis, and negative y-axis.

9. The computing device of claim 6, wherein the one or more processors are further configured to:
receive the set of allowed MVD magnitudes and directions, wherein the set of allowed MVD magnitudes and directions are signaled at slice header level.

10. The computing device of claim 6, wherein the one or more processors are further configured to:
receive multiple sets of allowed MVD magnitudes and directions, wherein the multiple sets of allowed MVD magnitudes and directions are generated at the encoder and signaled at sequence parameter set (SPS) level.

* * * * *